United States Patent [19]

Feurgard

[11] Patent Number: 4,917,853
[45] Date of Patent: Apr. 17, 1990

[54] PIPE FOR SUPPORTING AND POSITIONING MEASURING DEVICES IN THE CORE OF A NUCLEAR REACTOR

[75] Inventor: René Feurgard, La Celle Saint-Cloud, France

[73] Assignee: Framatome, Courbevoie, France

[21] Appl. No.: 125,509

[22] Filed: Nov. 25, 1987

[30] Foreign Application Priority Data

Nov. 26, 1986 [FR] France ................ 86 16505

[51] Int. Cl.$^4$ .................. G21C 17/00; G21C 19/22
[52] U.S. Cl. .................... 376/255; 376/203; 376/292
[58] Field of Search ............ 376/203, 204, 205, 245, 376/247, 254, 255, 291, 292, 463

[56] References Cited

U.S. PATENT DOCUMENTS

| | | |
|---|---|---|
| 3,751,333 | 8/1973 | Drummond et al. |
| 3,769,156 | 10/1973 | Brecy |
| 4,012,282 | 3/1977 | Hutter et al. |
| 4,298,430 | 11/1981 | Rolstad et al. |
| 4,318,776 | 3/1982 | Proell et al. |
| 4,426,352 | 1/1984 | Bybee et al. |
| 4,449,403 | 5/1984 | McQueen |

FOREIGN PATENT DOCUMENTS

| | | |
|---|---|---|
| 2081077 | 12/1971 | France |
| 2094195 | 2/1972 | France |
| 2377078 | 8/1978 | France |

Primary Examiner—Charles T. Jordan
Assistant Examiner—Richard W. Wendtland
Attorney, Agent, or Firm—Pollock, Vande Sande & Priddy

[57] ABSTRACT

The outer tubular shroud (14) of the measuring pipe (10) comprises a plurality of internally machined spacers (30), each intended to receive a set of measuring devices (32). The spacers (30) are connected by successive lengths of flexible tubing. The outer shroud (14) is open at its end part which emerges into the reactor core and comprises openings (27) in its side wall. This shroud is thus placed under equal pressure and the measuring devices (32) are in direct contact with the reactor coolant fluid.

5 Claims, 4 Drawing Sheets 4,917,853

PIPE FOR SUPPORTING AND POSITIONING MEASURING DEVICES IN THE CORE OF A NUCLEAR REACTOR

FIELD OF THE INVENTION

The invention relates to a pipe for supporting and positioning measuring devices in the core of a nuclear reactor.

BACKGROUND OF THE INVENTION

When use is made of nuclear reactors such as pressurized water nuclear reactors, measurements have to be carried out in the core consisting of the fuel assemblies while the reactor is operating. In particular, neutron flux measurements have to be carried out at various locations along the height of the core to gain information about the distribution of the neutron flux or of power along the axial direction of the core, which usually corresponds to the vertical direction.

The middle section of the fuel assemblies forming the core comprises an instrumentation tube into which it is possible to introduce, throughout the height of the core, a leakproof thimble inside which a neutron flux measurement probe is moved while the reactor is operating. The thimbles associated with each of the fuel assemblies in which flux measurements are being carried out must be capable of being withdrawn from these assemblies, for example when the core is recharged. These thimbles are therefore mounted so that they can move slidingly inside the guide tubes connecting the lower part of the vessel to a measuring room in which the ends of the thimbles which are opposed to the ends inserted into the core are accessible for moving the probes, for collecting the measuring signals and for moving the thimbles inside the guide tubes. The movement of the thimbles in the guide tubes is performed merely by pushing or pulling, sufficient play being provided to limit the forces to be applied to the thimble, despite the guide tubes being curved in shape over most of their extent.

In addition to the movable neutron flux measurement probes, use is also made of a set of flux measuring devices such as collectrons placed in a stationary position in the core and at various levels along its height.

Devices for measuring temperature, pressure or level also have to be used while the reactor is operating, and these are installed at various predetermined locations in the core.

In order to simplify the instrumentation of the core as well as the procedures for using and maintaining this instrumentation, it has been proposed to place all the measuring devices relating to a core assembly in which measurements are carried out inside a leakproof supporting and positioning pipe designed similarly to the thimbles which receive the movable probe. A pipe of this kind comprises a tubular external shroud in which there is mounted, in a central position and coaxially with the shroud, a sheath or thimble which makes it possible to guide a movable probe for measuring the neutron flux.

Measuring devices such as collectrons are placed in the pipe, around the central sheath and in fixed positions distributed along the length of the pipe. The pipe for supporting and positioning the measuring devices has a diameter which is slightly smaller than the diameter of a guide tube which permits it to move and connects the lower section of the vessel to the measuring room. The pipe may be positioned in the core or withdrawn from the core, from the measuring room, merely by pushing or pulling its end. All the measuring devices and the thimble in which the movable probe travels can be positioned or withdrawn in this manner. It is obviously necessary to use a central thimble and a neutron flux measurement probe which are miniaturized when compared with the prior art, the assembly instrumentation tubes being the same as those which were intended to receive only thimbles. Similarly, the passages set aside for the pipe for supporting and positioning measuring instruments in the internal structures of the reactor vessel, between the bottom of the vessel and the base of the core, as well as the guide tubes, are the same as those which were used to guide thimbles alone.

These measuring pipes or sticks must have sufficient flexibility to be capable of being moved without undue effort by being pushed and pulled inside the curved guide tubes connecting the measuring room to the bottom of the vessel. The outer shroud of these measuring pipes or sticks must, furthermore, withstand considerable forces in a fluid at a high temperature and high pressure and under irradiation. This leakproof outer shroud must, in particular, withstand the pressure of the primary cooling water exerted on its wall while the reactor is operating.

It is therefore very difficult to design an outer shroud which simultaneously possesses sufficient flexibility properties to be readily moved in the guide tubes and satisfactory mechanical strength properties under the conditions of use which prevail in the nuclear reactor. In particular, it is very difficult to find a material capable of having sufficient characteristics to form a thin tubular shroud which is subjected to high mechanical stresses in the reactor vessel and in the guide tubes.

The problems of construction of the measuring pipe are increased further by the fact that this pipe must permit the positioning of a sheath or thimble in its middle section and of measuring devices in a fixed position and distributed along its length around the central sheath.

Furthermore, some measurements, such as the measurements of temperature, pressure or liquid level in the reactor core are very difficult to perform properly or are even impossible so long as use is made of measuring means which are separated by a continuous wall from the primary fluid of the reactor.

SUMMARY OF THE INVENTION

The purpose of the invention is therefore to propose a pipe for supporting and for positioning measuring devices in the core of a nuclear reactor which is mounted so that it can move in a guide tube connecting the reactor vessel in which the core is placed to a measuring room and comprising a tubular outer shroud, a central sheath arranged coaxially with the interior of the shroud for guiding a movable neutron flux measuring probe, measuring devices placed in the tubular shroud, around the central sheath, in fixed positions distributed along the length of the pipe, and conductors extending along the length of the pipe and connected to the measuring devices, this pipe simultaneously having a sufficient flexibility to be readily moved in the guide tube and satisfactory mechanical strength under the conditions of use of the reactor and permitting measurements of a large number of physical parameters to be performed under proper conditions and in well-defined positions, while at the same time being simple in structure and easy to design and to construct.

To this end, the tubular outer shroud comprises a plurality of internally machined components of tubular shape, or spacers, each intended to receive a set of measuring devices placed in a predetermined position along the length of the pipe and successive lengths of flexible tubing including an initial length having a first end intended to enter the measuring room and a second end connected to a first spacer, each of the intermediate lengths connecting two successive spacers and a final length extending the pipe beyond the spacer which is the furthest away from the initial length, open at its free end, with the tubular shroud additionally comprising openings in its side wall, which are distributed in regions at intervals along its length.

BRIEF DESCRIPTION OF THE DRAWINGS

In order that the invention may be more clearly understood, a description will now be given, by way of example and with reference to the attached drawings, of an embodiment of a measuring pipe according to the invention.

DESCRIPTION OF PREFERRED EMBODIMENT

Figure 1:
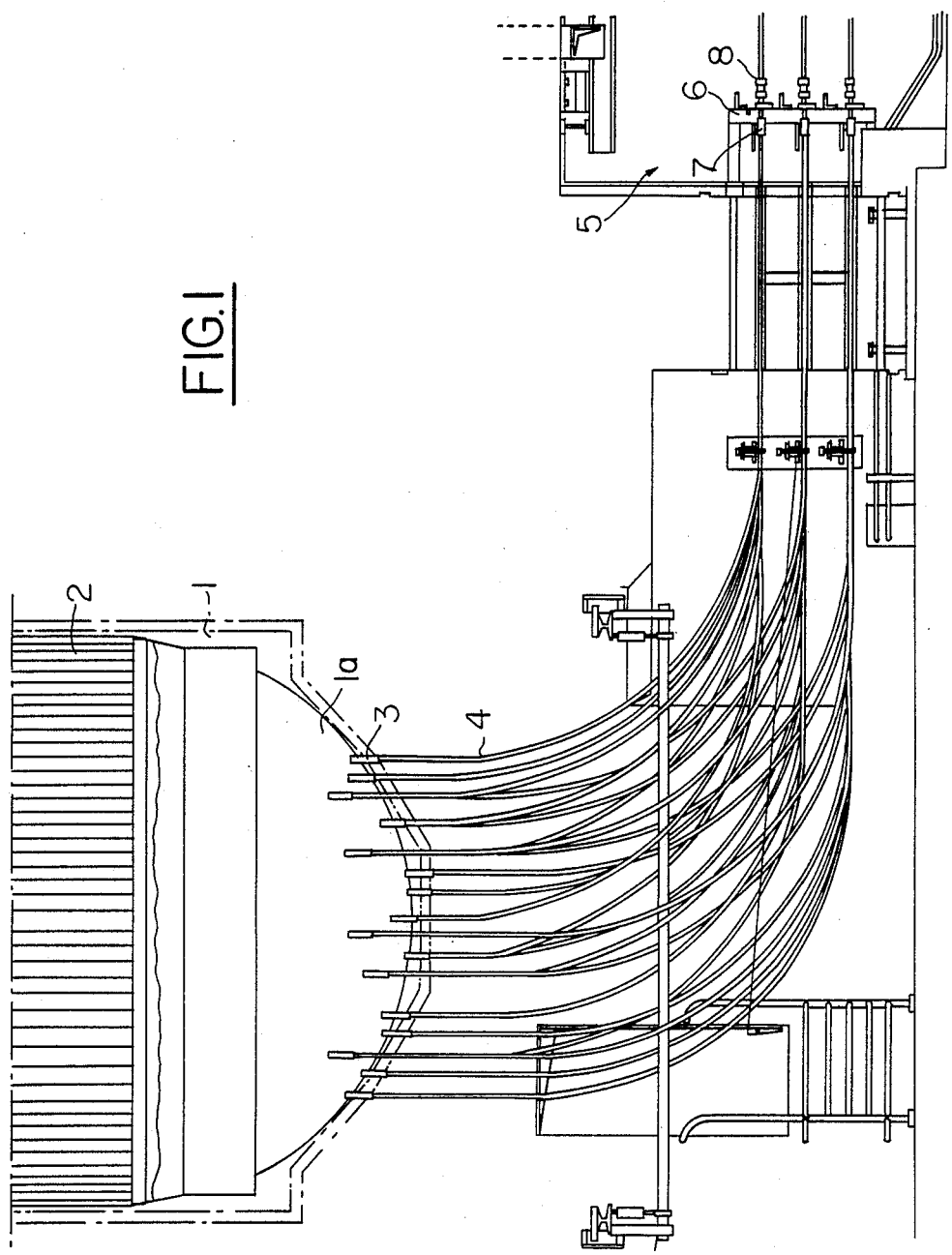
FIG. 1 is a diagrammatic sectional elevation view of the lower section of a pressurized water nuclear reactor vessel and of a measuring room arranged to the side and in the vicinity of the bottom of the vessel.

FIG. 1 shows the bottom 1a of the vessel 1 of a pressurized water nuclear reactor enclosing the reactor core 2 consisting of fuel assemblies. Sleeves 3 pass through the bottom 1a of the vessel and each of these is connected to a tube 4 permitting the guidance of a measuring pipe. The guide tubes 4 are curved and are then directed in the form of successive horizontal layers towards a measuring room 5 arranged at a level below the level of the bottom of the vessel 1a and to the side relative to the vessel 1. Each of the guide tubes 4 enters the measuring room 5 and is then successively connected, at a supporting wall 6, to an isolation valve 7 and a sealing nozzle 8.

The valve 7 permits the end of the guide tube 4 to be closed in a completely leakproof manner when the corresponding measuring pipe has been completely withdrawn.

The nozzle 8 comprises sealing devices enabling the initial length of the measuring pipe to be withdrawn in a leakproof manner from the guide tube.

Figure 2:
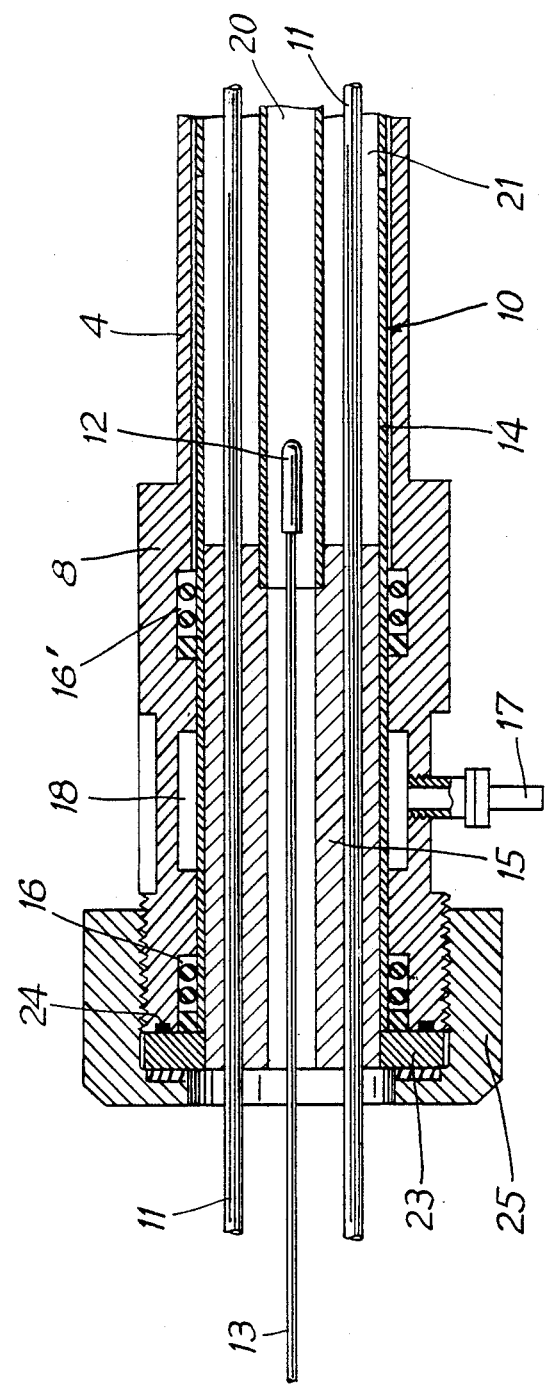
FIG. 2 is a sectioned view of the leakproof passage device for the measuring pipe, where it enters the measuring room.
Figure 3:
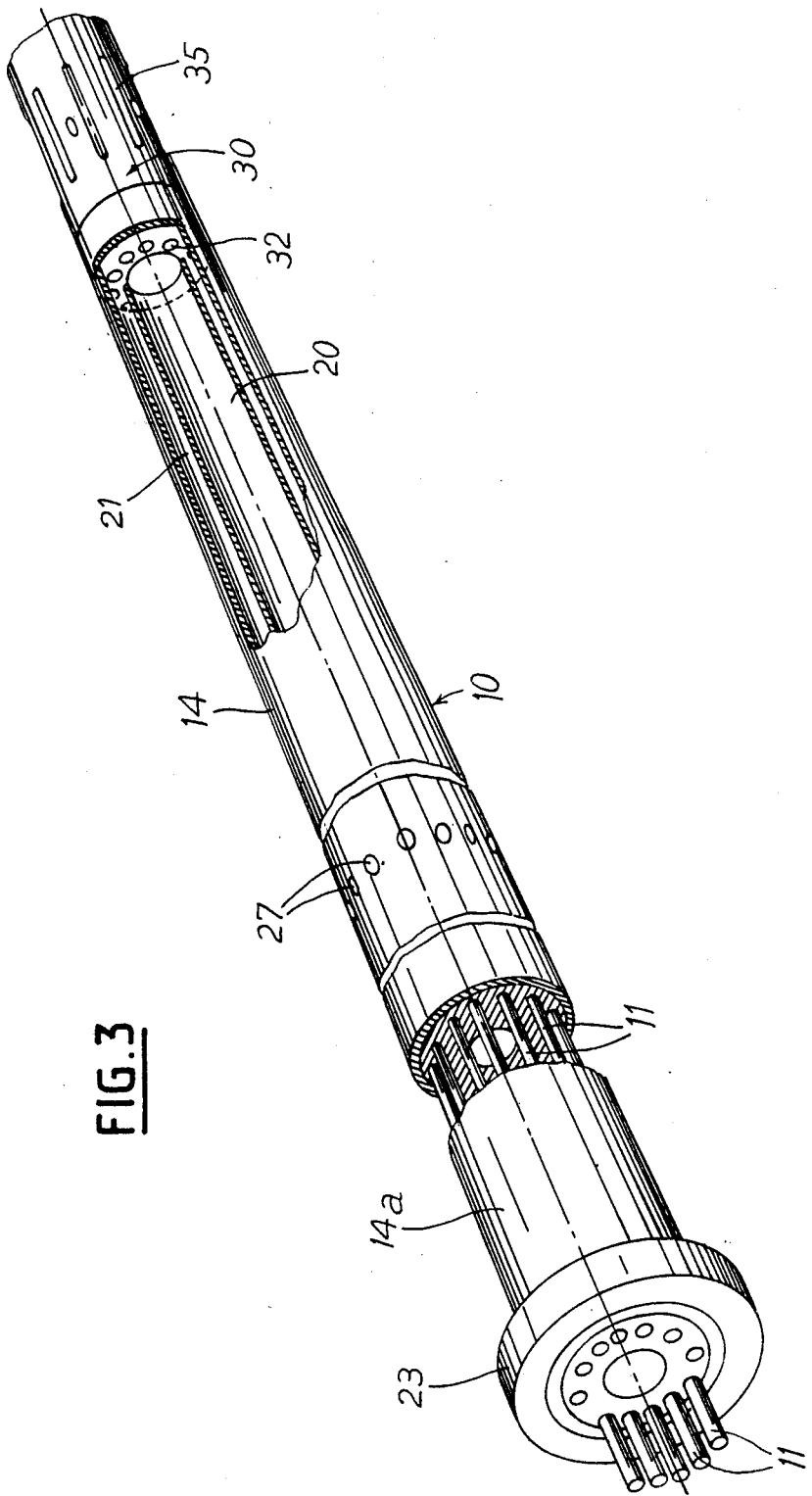
FIG. 3 is a perspective view of the initial length and of the first spacer of a measuring pipe according to the invention.

As can be seen in FIGS. 2 and 3, this initial length of the measuring pipe 10 emerging in the room 5 makes it possible to collect the signals originating from the movable neutron flux measurement probe 12 and from measuring devices placed in a fixed position in the pipe 10, by virtue of conductors 11 running along the length of the pipe 10. The travel of the probe 12, which is fastened to the end of a semi-rigid cable 13, can also be controlled from the room 5.

As can be seen in FIG. 2, the nozzle 8 is fastened at the end of the guide tube 4 which enters the room 5. The pipe 10 has been shown in its operating position, completely inserted into the nozzle 8 and into the guide tube 4. The measuring pipe, indicated as a whole by reference 10, comprises an outer shroud 14 consisting, in its initial length, of a thin zirconium alloy tube whose external diameter is slightly smaller than the internal diameter of the guide tube 4. The end of the tube 14 is engaged in the nozzle 8, inside which seals 16 and 16' are arranged in two grooves set apart along the length of the nozzle 8. The seals 16 and 16' are in contact with the outer surface of the tube 14 and ensure a leakproof connection between the tube 14 and the nozzle 8. Seals 16 and 16' are sliding seals permitting the movement of the tube 14 in the axial direction inside the nozzle 8, while keeping it leakproof. Between the seals 16 and 16', the nozzle 8 forms an annular chamber 18 connected to a pressurized water circuit by means of a connector nozzle 17.

A tubular sleeve 15 is inserted into the tubular shroud 14 engaged in the nozzle 8 and is fastened by welding inside the shroud 14. The end of the sheath or thimble 20 in which the movable probe 12 travels is fastened to the sleeve 15. This sheath 20 is arranged in the middle section and along the axis of the measuring pipe 10. The diameter of the sheath 20 is such that an annular space 21 is provided between the outer surface of the sheath 20 and the inner surface of the shroud 14 of the pipe 10.

The sleeve 15 is pierced with openings permitting the conductors 11 to pass towards the room 5, the conductors 11 being, however, fastened into the passage openings in a leakproof manner, in order to keep the annular space 21 completely isolated from the room 5.

At its end, the tubular shroud 14 is also integrally connected to a flange 23 which bears on the end of the nozzle 8, a sealing gasket 24 being inserted in between, when the measuring pipe is in the position shown in FIG. 2. The pipe 10 is held in this position by a nut 25 screwed onto a threaded section of the nozzle 8.

The position of the measuring pipe 10 shown in FIG. 2 corresponds to the position of the measuring pipe which is completely inserted into the reactor core. In this position, the thimble 20 situated in the central section of the measuring pipe extends throughout the height of the core and the measuring devices which are placed in fixed positions along the length of the measuring pipe in the annular space 21 are distributed at regular intervals throughout the height of the core.

Neutron flux measurements can then be carried out over the entire height of the core by means of the probe 12 which can move inside the pipe 20. Measurements of physical parameters or of neutron flux can also be obtained continuously at various heights in the core by virtue of the measurement devices connected to the end of the conductors 11.

FIGS. 2 and 3 show that the initial section 14a of the tubular shroud 14, as far as the seal 16', is completely isolated from the internal volume of the guide tube 4, which is itself in communication with the interior of the reactor vessel 1 and which contains pressurized water. This initial section 14a of the shroud of the measuring pipe 10 is known as a dry section, because it never comes into contact with the pressurized water of the reactor.

FIG. 3 shows that beyond the dry section 14a, the tubular shroud 14 extends up to a first tubular spacer 30, inside which measuring devices 32 arranged around the central sheath 20 are fixed in the annular space 21. Conductors 11 enable these measuring devices 32 to be supplied with electric current and/or enable measurement signals to be continuously transmitted and collected.

The section of the measuring pipe between its end flange 23 and the first spacer 30 forms the initial length made in the form of a thin zirconium alloy tube, inside which the sheath 20 is placed in a central position, beyond the dry section 14a.

The outer shroud 14 of the initial section of the pipe 10 is pierced with openings 27 distributed over its periphery along an annular region situated at a distance from the end of the pipe 10 which emerges into the room 5, of the order of four meters, i.e., a distance equivalent to the height of the core. The holes 27 bring the annular space 21 in the pipe into communication with the internal volume of the guide tube 4, filled with pressurized water.

When the pipe 10 is in the position in which it is completely inserted into the core, as shown in FIG. 2, the first spacer 30 is in a fixed position in the bottom section of the core and the measuring devices 32 make it possible to measure the neutron flux, since some of these devices are collectrons, and various physical parameters, such as temperature, pressure or the level of the primary fluid.

One of the essential features of the measuring pipe according to the invention is, in fact, that its internal section, around the central sheath 20, forming the annular space 21, is filled with primary water in a pressure and temperature equilibrium with the water filling the vessel 1. The tubular shroud 14 is therefore at an equal pressure and is not stressed by the pressurized primary water. In the initial length of the pipe 10, this pressure equalization is obtained by virtue of the openings 27 and of other similar openings passing through the shroud 14 and distributed along the length of the pipe.

In order to carry out a reactor core recharging operation, the vessel being depressurized and open, the measuring pipe assembly must be withdrawn from the core, by pulling on its end which emerges into the measuring room 5. When the measuring pipe 10 has been withdrawn over a length of about four meters, the position of the holes 27 passing through the tubular shroud 14 coincides with the annular chamber 18 of the nozzle 8. By making use of the pressurized water circuit connected to the connector nozzle 17, it is then possible to control the internal circulation in the annular space 21 of the measuring pipe, in order to check whether blockages have not restricted the ability of the pressurized water to circulate in this space.

The whole measuring pipe 10 consists of a series of flexible and supple lengths of tubing separated by rigid spacers and short in length, which will be described with reference to FIGS. 4, 5 and 6. The sheath 20 forming the central section of the measuring pipe is arranged coaxially with the shroud 14 throughout the length of the latter and is closed at its end, forming a thimble whose internal volume, completely isolated from the primary fluid filling the vessel and the guide tube, at its end, is in direct communication with the measuring room 5.

Following the initial length which was described with reference to FIG. 3, the outer shroud 14 of the pipe 10 comprises three intermediate lengths, each arranged between two successive spacers, and a final length extending the last spacer, i.e., the spacer which is furthest away from the pipe end located in the measuring room 5; this final length is open at its end which, when in use, is immersed in the primary water of the nuclear reactor.

The whole of the measuring pipe comprises four spacers separated by intermediate lengths of the outer shroud 14, approximately one meter in length. The measuring devices, in a fixed position in the pipe 10 and fixed in the inner parts of the spacers 30, are thus distributed in the four regions of the core which are uniformly spaced along its height.

Figure 5:
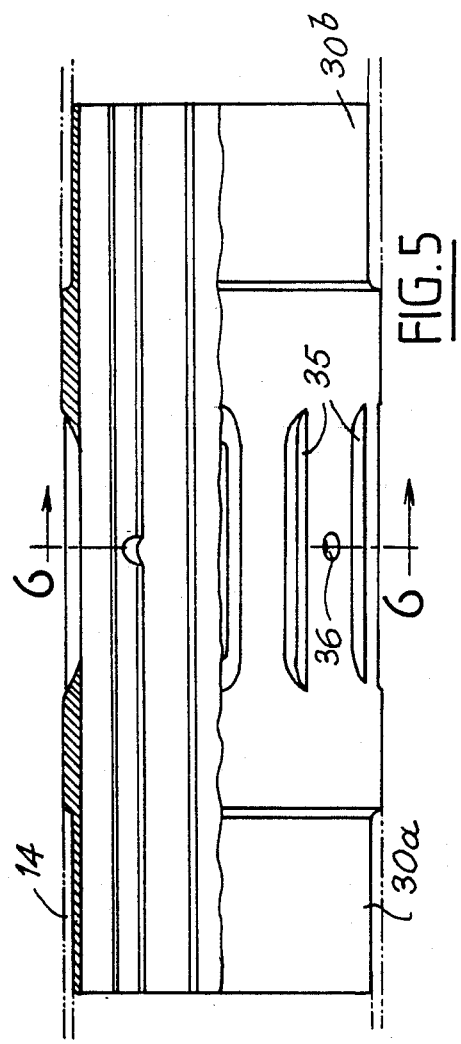
FIG. 5 is a partially sectioned side view of the spacer shown in FIG. 4.
Figure 4:
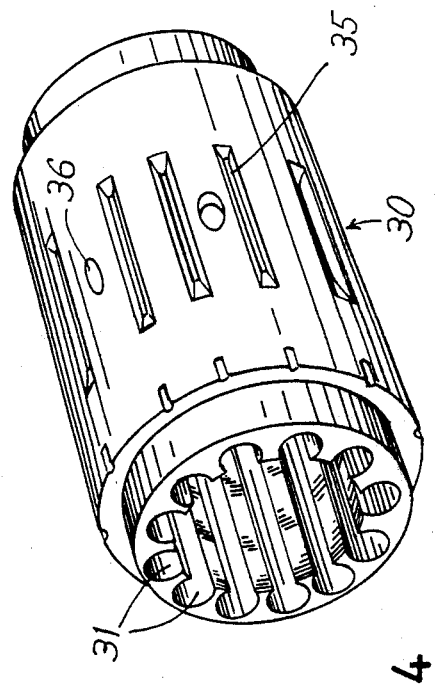
FIG. 4 is a perspective view of a spacer of the measuring pipe according to the invention.
Figure 6:
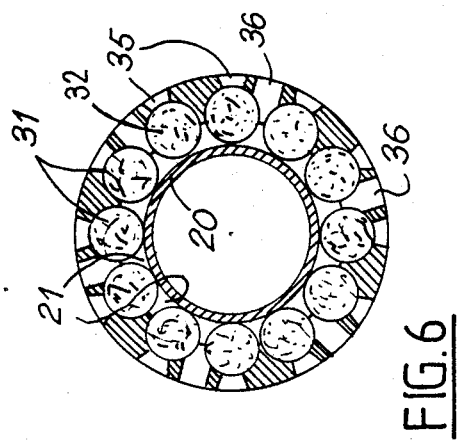
FIG. 6 is a view of an end of the spacer along line 6—6 of FIG. 5.

FIGS. 4, 5 and 6 show a spacer 30 forming one of the components of the tubular outer shroud 14 of the pipe 20. A spacer of this kind consists of a rigid zirconium alloy sleeve in which there are machined twelve semi-cylindrical housings 31. As a general rule, from eight to twelve housings may be provided in each of the spacers 30. As can be seen in FIG. 6, each of the housings 31 receives a measuring device or sensor 32, of cylindrical shape, which is arranged and fixed in the spacer 30 and throughout its length.

Figure 6A:
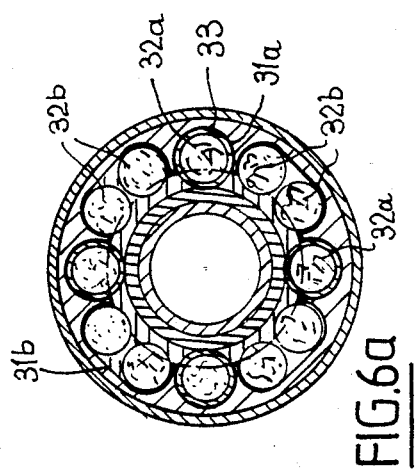
FIG. 6a is a sectioned view similar to FIG. 6, of an alternative embodiment of the pipe according to the invention.

FIG. 6a shows an alternative embodiment of the spacer. Instead of identical housings 31, the inner part of the spacer comprises four housings 31a of circular cross-section and four housings 31b whose cross-section allows two sensors to be arranged side by side. It will be noted that each of the measuring devices 32a is placed in a tube 33, itself fixed in the spacer. This tube is closed at its end which, when in use, is in the reactor core, and is fitted and welded into the sleeve 15 (FIG. 2) at its other end. The sensors 32a are thus isolated from the pressurized water of the reactor, whereas the outer surface of the tube 33 is in contact with the water and is thus exposed to pressure. In point of fact, it may be advantageous to isolate some sensors from the reactor cooling water. The sensors 32b, on the other hand, are in direct contact with the cooling water inside the twin housings 31b whose shape ensures better wetting and contact with water over a greater proportion of the sensor's surface.

The measuring devices 32, 32a and 32b, which are placed in a spacer 30 following one another at the internal periphery of this spacer, serve different purposes and consist of collectrons permitting the measurement of neutron flux, thermocouples, thermal transducers, acoustic sensors, level detectors or other devices for measuring physical or neutron parameters in the core. Some devices may be present as several replications in order to provide redundant measurements. Some housings 31 may be vacant and reserved for the insertion of new sensors which might be found necessary. Other housings are also reserved for the passage of connecting conductors 11.

When the measuring devices 32 are in position in the spacer 30, the space reserved in the central section of the spacer is sufficient to enable the sheath 20 of the movable measuring probe to be housed. FIG. 6 shows the location of the sheath, in the middle of the spacer, this sheath 20 being held in place in the middle of the spacer and thus of the measuring pipe 10 by the measuring devices 32 themselves.

The spacer 30 is machined on its peripheral surface to form twelve slots 35, each opening into the bottom of a semi-cylindrical housing 31 which receives a measuring device 32. When the measuring devices 32 are positioned in the housings 31, their fastening to the spacer is ensured by welding or by clipping, the additional weld metal being run into the slots 35.

Additionally, holes 36 which pass through the side wall of the spacer 30 to emerge into the annular space 21 between the spacer and the sheath 20 are provided between the slots 35, in the middle of every alternate space separating these slots. The purpose of the six holes 36 produced in this manner is, on the one hand, the same as that of the holes 27 made in the wall of the initial length of the pipe 10, permitting a pressure equilibration of the outer shroud of the pipe 10 at the spacers and, on the other hand, they make it possible to promote good wetting of the interior section of the spacer and especially of the measuring devices 32 and 32a, which are come into contact with the water, in contrast to the measuring devices 32b, which comprise an outer tube 33 isolating the sensor from the liquid phase. The spaces which are left between the various components of the pipe 10 are, in fact, very narrow and good wetting of these components can be ensured only by providing a sufficient number of orifices along the length of the pipe, and especially at the spacers.

As can be seen in FIG. 5, each of the spacers comprises two end parts 30a and 30b permitting the insertion and fastening by welding of a zirconium alloy tube forming the running section of the outer shroud of the pipe 10 and providing the connection between successive spacers 30.

The conductors 11 for supplying and collecting signals from the measuring devices 32 are arranged along a series of helices, throughout the length of the pipe 10, in the annular space 21, between the central sheath 20 and the outer shroud 14. At the spacers, the conductors 11 are arranged and clipped in the free parts of this space, between the measuring devices 32. The conductors 11 may also run through the housings 31 which do not receive any measuring device.

In the case of a guide tube of a pressurized water nuclear reactor, the measuring pipe has an external diameter of about 9 mm and the central sheath or thimble of the movable neutron measurement probe has an external diameter of about 4.5 mm. The miniaturized measuring devices arranged in the spacers have a diameter of about 1.5 mm and the conductors 11, a diameter of about 1 mm. The flexible zirconium alloy tubing forming the sections of the outer shroud 14 of the measuring pipe connecting the spacers has a wall thickness of less than 0.5 mm. This flexibile and supple pipe enables the measuring pipe 10 to travel without any undue effort in the corresponding guide tube 4. Despite their greater rigidity, the spacers 30 do not cause any blockage in the guide tubes 4, because of their limited length (25 mm).

In addition, the outer shroud 14 of the pipe 10 is equilibrated in pressure and is therefore not subjected to the mechanical stress due to the pressure of the primary water. The central sheath 20 of the measuring pipe, on the other hand, is subjected to this pressure, but its small diameter, and the fact that it is perfectly supported and protected inside the shroud 14 of the measuring pipe, reduce the risks of damage to this sheath, in which the movable probe travels.

By virtue of the measuring devices 32 being placed in intimate contact with the pressurized water at the spacers 30, the measurements are performed under very good sensitivity and reproducibility conditions.

The device according to the invention can be adapted without any modification to the present designs of nuclear reactors. In particular, there is no need to modify the components responsible for guiding the instrumentation from the measuring room to the reactor core. These components comprise guide tubes, internal vessel structures forming guidance ducts and the guide tubes of the fuel assemblies.

The invention is not limited to the embodiment described.

The components forming the outer shroud of the pipe, especially the spacers, may be made in a form other than that described and of other materials. The dimensions of these components and especially their diameter will be adapted to the type of reactor and to the guidance structures associated with this reactor.

The measuring devices may be of any type whatever, so long as they can be housed within the spacers, at the periphery of the central sheath of the movable probe.

The outer shroud of the measuring pipe may be pierced with openings not only at the spacers, but also in any region desired, to ensure good pressure equalization and good wetting of the measuring devices within the pipe.

Finally, the measuring pipe according to the invention may be used in any type of reactor in which neutron measurements or physical measurements need to be carried out, by introducing devices of tubular shape within the core assemblies.

What is claimed is:

1. In a pressurized water nuclear reactor comprising a reactor vessel, a core placed in the reactor vessel, a measuring room, a plurality of guide tubes connecting the reactor vessel to the measuring room, a plurality of measuring pipes, each measuring pipe being mounted in a guide tube to be displaceable longitudinally inside the guide tube and comprising a tubular outer shroud, a central sheath arranged coaxially inside the shroud as a guiding element of a movable probe for measuring neutron flux, measuring devices placed in the tubular shroud around the central sheath, in fixed positions distributed along the length of the measuring pipe, and conductors connected to the measuring devices and placed longitudinally along the measuring pipe, the improvement consisting of measuring pipes in which the tubular shroud comprises a plurality of components of tubular shape, called spacers, each of said spacers being machined internally to receive a set of measuring devices placed in a predetermined position along the length of the measuring pipe and successive sections of flexible tubing, an initial section of said tubing having a first end inside the measuring room and a second end connected to a first spacer, intermediate sections each connecting two successive spacers and a final section placed beyond a final spacer which is furthest away from the initial section and open at its free end, and in which the tubular shroud comprises additionally openings in its side wall, in locations distributed at intervals along the length of the measuring pipe.

2. Measuring pipe according to claim 6, wherein openings (36) passing through the wall of the tubular shroud (14) are provided at each of the spacers (30) to ensure wetting of the measuring devices (32) by the reactor coolant fluid.

3. Measuring pipe according to claim 6, wherein the initial section of the tubular shroud (14) of the measuring pipe (10) enters the measuring room (5) by passing through a sealing nozzle (8) comprising two successive sliding leakproof seals (16, 16'), between which is arranged a chamber (18) connected to a connector nozzle (17) for supplying pressurized fluid, and wherein this initial section comprises openings (27) in its side wall, at a distance from its end which opens out into the measuring room (5), which is substantially equal to the height of the nuclear reactor, so that when the measuring pipe is withdrawn by pulling and sliding in the nozzle (8), over a length equivalent to the height of the core, the openings (27) are located in the annular chamber (18) of the nozzle (8), thus permitting circulation of fluid in the pipe (10) to be controlled.

4. Measuring pipe according to claim 1, wherein each of the spacers comprises slots (35) in its side wall, each of said slots opening into a housing (31) for a measuring device (32), weld metal being introduced into the slot (35) to fasten the measuring devices (32) in the spacer (30).

5. Measuring pipe according to claim 1, wherein the tubular shroud (14) is made of zirconium alloy.

* * * * *

UNITED STATES PATENT AND TRADEMARK OFFICE
CERTIFICATE OF CORRECTION

PATENT NO. : 4,917,853

DATED : APRIL 17, 1990

INVENTOR(S) : FEURGARD

It is certified that error appears in the above-identified patent and that said Letters Patent is hereby corrected as shown below:

Column 8, lines 60 and 65:
Claims 2 and 3 should be dependent on claim 1 (not claim 6).

Signed and Sealed this

Seventeenth Day of March, 1992

Attest:

HARRY F. MANBECK, JR.

*Attesting Officer*  *Commissioner of Patents and Trademarks*